(12) United States Patent
Roizin et al.

(10) Patent No.: US 12,353,012 B1
(45) Date of Patent: Jul. 8, 2025

(54) METHOD FOR MANUFACTURING AN OPTICAL SWITCHING SYSTEM

(71) Applicant: Tower Semiconductor Ltd., Migdal Haemek (IL)

(72) Inventors: Yakov Roizin, Afula (IL); Avi Strum, Haifa (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 0 days.

(21) Appl. No.: 18/822,024

(22) Filed: Aug. 30, 2024

Related U.S. Application Data

(63) Continuation of application No. 18/822,015, filed on Aug. 30, 2024.

(51) Int. Cl.
  *G02B 6/35* (2006.01)
  *G02B 6/136* (2006.01)
  *G02B 6/12* (2006.01)

(52) U.S. Cl.
  CPC ............ *G02B 6/136* (2013.01); *G02B 6/3502* (2013.01); *G02B 6/3546* (2013.01); *G02B 2006/12061* (2013.01); *G02B 2006/12145* (2013.01); *G02B 2006/12176* (2013.01)

(58) Field of Classification Search
  CPC .................................................. G02B 6/3502
  See application file for complete search history.

(56) References Cited

U.S. PATENT DOCUMENTS

| | | | |
|---|---|---|---|
| 4,545,111 A * | 10/1985 | Johnson | H10B 63/80 257/53 |
| 7,705,514 B2 | 4/2010 | He et al. | |
| 10,061,085 B2 | 8/2018 | Wu et al. | |
| 10,715,887 B2 | 7/2020 | Seok et al. | |
| 11,441,353 B2 | 9/2022 | Zhang et al. | |
| 2004/0151429 A1 | 8/2004 | Janz et al. | |
| 2005/0070076 A1* | 3/2005 | Dion | H01L 21/02532 438/478 |
| 2006/0183625 A1* | 8/2006 | Miyahara | C04B 35/486 501/153 |
| 2019/0253775 A1* | 8/2019 | Seok | G02B 6/12002 |

* cited by examiner

*Primary Examiner* — Charlie Y Peng
(74) *Attorney, Agent, or Firm* — Reches Patents

(57) ABSTRACT

A method for manufacturing an optical system, the method includes obtaining an intermediate semiconductor item that comprises a silicon substrate and a stack of layers that comprises a monocrystalline silicon layer and is positioned between two silicon alloy layers; wherein the silicon substrate comprises diffusion regions; and performing Complementary Metal-Oxide-Semiconductor (CMOS) compliant operations to provide, based on the intermediate semiconductor item, a first switching cell that is formed on the silicon substrate.

20 Claims, 21 Drawing Sheets

19B

19C

19D

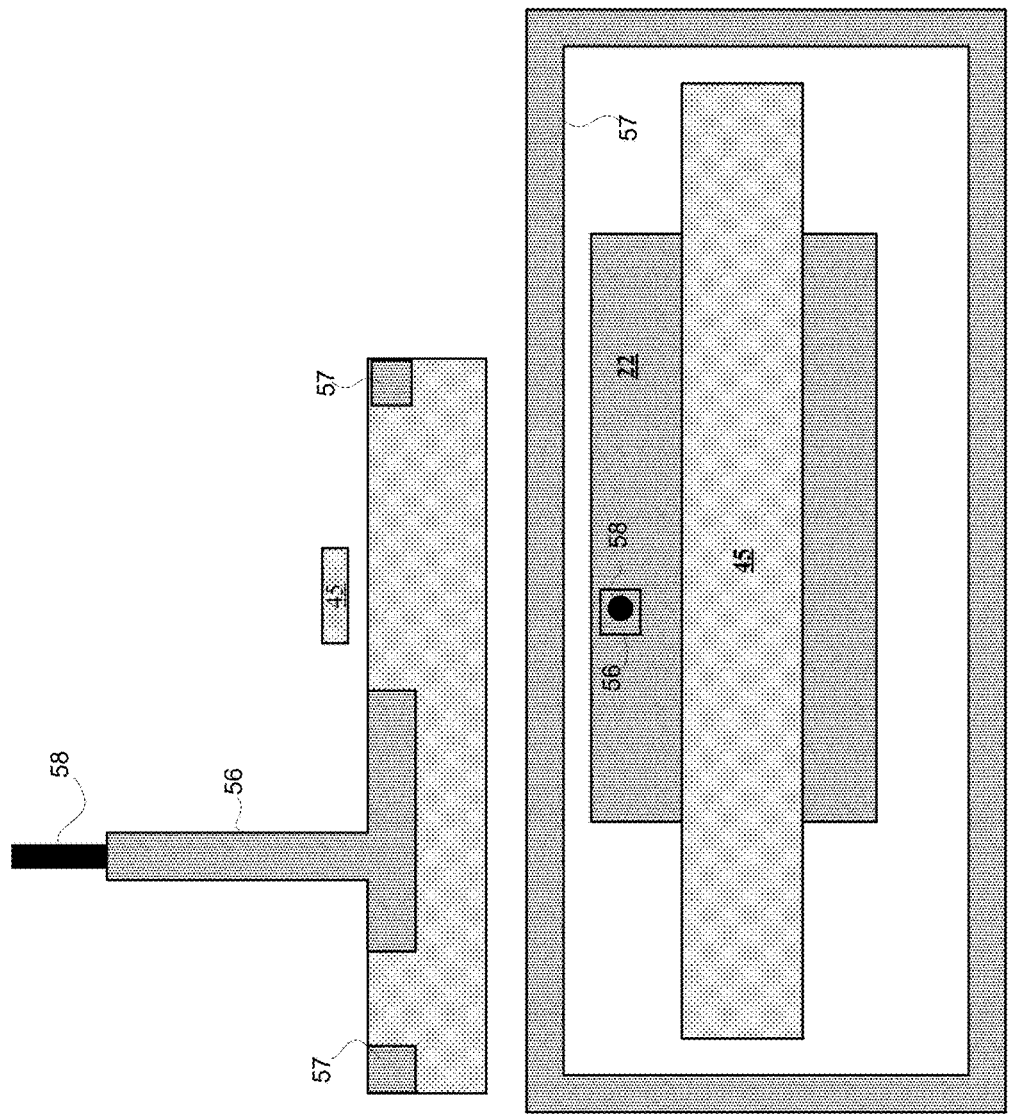

Obtaining an intermediate semiconductor item that includes a silicon substrate and a stack of layers that includes a monocrystalline silicon layer and is positioned between two silicon alloy layers. The silicon substrate includes diffusion regions. 210

Performing Complementary Metal-Oxide-Semiconductor (CMOS) compliant operations to provide, based on the intermediate semiconductor item, a first switching cell that is formed on the silicon substrate. The first switching cell includes: a first port, a second port, a third port, a monocrystalline silicon waveguide (MSW) that includes a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide. 220

METHOD FOR MANUFACTURING AN OPTICAL SWITCHING SYSTEM

BACKGROUND OF THE INVENTION

Optical communication is capable of increasing the throughput of communication. Examples of optical components are illustrated in US patents U.S. Pat. Nos. 10,715,887, 7,705,514, 10,061,085, and 11,441,353

There is a growing need to increase the capacity of communication using optical communication while reducing the cost, reliability and complexity of optical communication component such as optical switching systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 9-20 illustrate the outcome of multiple manufacturing processes; and

FIG. 21 illustrates an example of a method.

Figure 1:
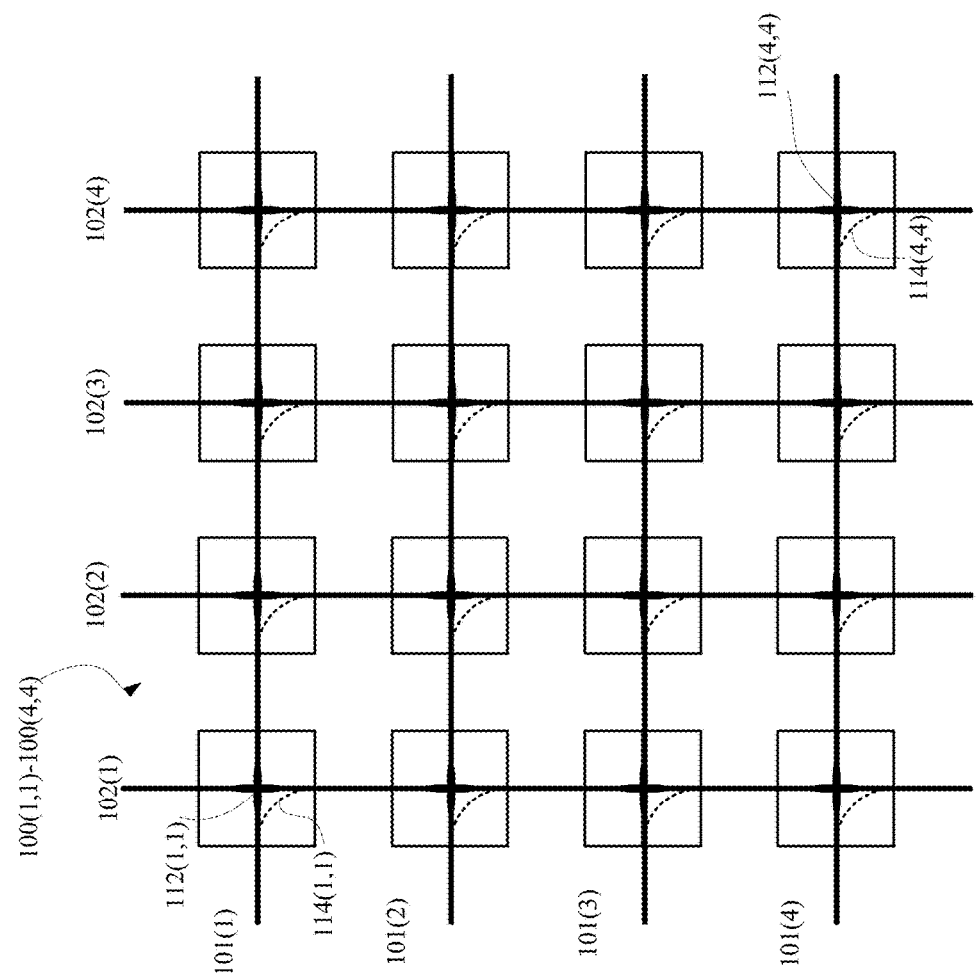
FIG. 1 illustrates an example of an array of switching cells of an optical switching system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

According to an embodiment there is provided an optical switching system that includes one or more optical switching cells.

According to an embodiment, the optical switching system includes a silicon substrate and one or more optical switching cells that for formed on the silicon substrate—and do not include an insulator layer between the silicon substrate and the one or more optical switching cells. This aspect reduces the cost of manufacturing the optical switching system.

According to an embodiment, the optical switching system is manufactured using a Complementary Metal-Oxide-Semiconductor (CMOS) compliant manufacturing process—and differs from Silicon on Insulator (SOI) manufacturing process that is more costly.

According to an embodiment, a CMOS compliant manufacturing process is a type of metal-oxide-semiconductor field-effect transistor (MOSFET) fabrication process that manufacture complementary and symmetrical pairs of p-type and n-type MOSFETs for logic functions. An example of a definition of CMOS is provided by Wikipedia.org and refers to the phrase "metal-oxide-semiconductor" as a reference to the physical structure of MOS field-effect transistors, having a metal gate electrode placed on top of an oxide insulator, which in turn is on top of a semiconductor material. Aluminium was once used but now the material is polysilicon. Other metal gates have made a comeback with the advent of high-κ dielectric materials in the CMOS process, as announced by IBM and Intel for the 45 nanometer node and smaller sizes.

According to an embodiment, a CMOS compliant manufacturing process includes MEMS and/or NEMS manufacturing operations.

According to an embodiment, the optical switching system includes one or more monocrystalline silicon coupling waveguides-which are more robust than other polycrystalline silicon waveguides, have much smaller light propagation losses than polycrystalline waveguides—and the CMOS compliant manufacturing process supports the generation of the one or more monocrystalline silicon waveguides (MSWs).

According to an embodiment, the optical switching system includes one or more bus waveguides that are made of Silicon Nitride—and are capable of conveying light signals of intensity that exceeds intensities of light signals conveyed by silicon. Since in the optical route from the first to the second port, the crystalline silicon waveguide contributes by only by a small part in the total optical losses, light with high intensity can be conveyed from one port to another. According to the embodiment, the actuation field can be applied in two directions and thus makes the solution immune to sticking effects.

According to an embodiment, the optical switching system includes one or more MSWs that includes MSW segments, and the switching includes manipulating the MSW segments—while maintaining another MSW segment static—which greatly simplifies the manufacturing of the MSW and any support element for supporting the MSW.

According to an embodiment, the optical switching system includes one or more MSWs that includes MSW segments that are movable between three or more positions.

According to an embodiment, the three or more positions include a proximal position, an intermediate position, and a distal position.

According to an embodiment, the optical switching involves moving the MSW segments between the proximal and the distal positions.

According to an embodiment, an MSW segment may be unwantedly stuck in one or more of the proximal and the distal positions and switching that MSW segment to the intermediate position overcome that unwanted situation.

According to an embodiment, one of proximal position and the distal position is a default position of a MSW segment—in the sense that the MSW segment remains at that position when no voltage is provided by a corresponding actuator.

According to an embodiment, the one or more switching cells include an actuation unit that may move the MSW segments in one direction or in two directions.

According to an embodiment, there is provided an optical switching system that includes a silicon substrate, and one or more switching cells.

According to an embodiment, the optical switching system includes an array of switching cells. The array may be a grid of optical switching cells and bus waveguides that pass through the array.

According to an embodiment, a switching cell of the optical switching system is formed on the silicon substrate, and includes a first port, a second port, a third port, a fourth port, an MSW that includes a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide.

According to an embodiment, the first bus waveguide is made of Silicon Nitride.

According to an embodiment, the first bus waveguide has a rib cross section.

According to an embodiment, the first bus waveguide includes a bottom cladding oxide and a top cladding oxide.

According to an embodiment, a thickness of the bottom cladding oxide ranges between 0.1 and 0.2 microns and a thickness of the top cladding oxide ranges between 0.3 to 1 micron.

According to an embodiment, the actuation unit is a microelectromechanical system (MEMS) actuation unit or a nanoelectromechanical system (NEMS) actuation unit.

According to an embodiment, the at least three different positions include of a proximal position, an intermediate position, and a distal position.

According to an embodiment, the one of proximal position and the distal position is a default position of the first MSW segment.

According to an embodiment, the optical switching system includes setting the default position by an asymmetric design of the first MSW segment.

According to an embodiment, the optical switching system includes setting the default position by increasing a stickability related to one side of the first MSW segment in relation to another side of the first MSW segment.

According to an embodiment, the first MSW segment is positioned between a proximal silicon germanium element and a distal silicon germanium element.

According to an embodiment, the first MSW segment and the second MSW segments have a rib cross-section.

According to an embodiment, a thicknesses of each one of the proximal silicon germanium element and the distal silicon germanium element range between 0.1 to 1 micron.

According to an embodiment, the actuation unit includes electrodes positioned on opposite sides of each of the first MSW segment and the second MSW segment.

According to an embodiment, the each one of the first and second MSW segments remain at a default position while the actuation unit is idle.

According to an embodiment, the silicon substrate includes diffusion regions that form electrodes in the silicon substrate of the actuation unit.

According to an embodiment, the optical switching system includes a distal portion that includes distal electrodes of the actuation unit.

According to an embodiment, the first switching cell further includes a fourth port and a second bus waveguide that is formed between the second port to the fourth port.

According to an embodiment, an aggregate area of the first MSW segment and the second MSW segment does not exceed 30 percent of an area of the MSW.

According to an embodiment, the optical switching system includes an array of switching cells, the array includes the first switching cell.

According to an embodiment there is provided a method for optical switching, the method includes
  a. receiving, by an actuation unit, one or more signals that are indicative of a configuration of a first switching cell of the optical switching unit; the first switching cell is formed on the silicon substrate, and includes a first port, a second port, a third port, and an actuation unit;
  b. configuring, by the actuation unit and based on the one or more signals, the first switching cell by setting a position of a first monocrystalline silicon waveguide (MSW) segment and a second MSW segment of a MSW of the first switching cell; wherein a position of each one of the first MSW segment and the second MSW segment is selected out of at least three positions;
  c. receiving, by the first port, an optical signal; and
  d. outputting the optical signal from the first switching cell, wherein when the first optical cell is configured at a first configuration the optical signal passes through the MSW and is outputted from the second port, wherein when the first optical cell is configured at a second configuration the optical signals passes through a first bus waveguide and is outputted through the third port.

According to an embodiment, the method includes using any of the optical switching system illustrated in this application.

According to an embodiment, there is provided a method for manufacturing any of the optical switching system illustrated in this application.

According to an embodiment, there is provided a method for manufacturing an optical system, the method includes:
  obtaining an intermediate semiconductor item that includes a silicon substrate and a stack of layers that includes a monocrystalline silicon layer and is positioned between two silicon alloy layers; wherein the silicon substrate includes diffusion regions.

Performing Complementary Metal-Oxide-Semiconductor (CMOS) compliant operations to provide, based on the intermediate semiconductor item, a first switching cell that is formed on the silicon substrate. The first switching cell includes: a first port, a second port, a third port, a monocrystalline silicon waveguide (MSW) that includes a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide.

According to an embodiment, the performing of the CMOS compliant operations processes includes etching the stack of layers by an etching process that exhibits a higher etching rate of the silicon alloy layers in comparison to an etching rate of the monocrystalline silicon layer.

According to an embodiment, the etching is preceded by forming etch material conduits, and the etching includes using the etch material conduits to convey etch materials that etch the stack of layers.

According to an embodiment, the material conduits have a diameter that ranges between 0.5 to 2 microns.

According to an embodiment, the etching is followed by sealing the etch material conduits.

According to an embodiment, the optical system is included in a first wafer, wherein the sealing includes bonding the first wafer to a second wafer.

According to an embodiment, the method includes thinning the second wafer and exposing second wafer vias formed within the second wafer, the second wafer vias are electrically coupled to first wafer vias of the first wafers that are electrically coupled to at least some electrodes of the actuation unit.

According to an embodiment, the forming of the etch material conduits comprising coating a surface of the first wafer and the etch material conduits with a coating material, wherein the bonding is preceded by removing the coating material.

According to an embodiment, the coating material is aluminum oxide.

According to an embodiment, the method includes thinning the first wafer.

According to an embodiment, the bonding is preceded by filling at least a portion of the etch material conduits with a sealing material.

According to an embodiment, the performing of the CMOS compliant operations includes forming a first MSW segment conductive path to the first MSW segment and forming a second MSW segment conductive path to the second MSW segment.

According to an embodiment, the performing of the CMOS compliant operations includes forming a first substrate electrode conductive path to a first substrate electrode, and a second substrate electrode conductive path to a second substrate electrode.

According to an embodiment, the performing of the CMOS compliant operations includes forming a first distal electrode conductive path to a first distal electrode and forming a second distal electrode conductive path to a second distal electrode.

According to an embodiment, the first MSW segment conductive path and the second MSW segment conductive path to the second MSW segment reach one facet of the first wafer and the first distal electrode conductive path, and the second distal electrode conductive path reach another facet of the first wafer.

According to an embodiment, the performing of the CMOS compliant operations provides an array of switching cells, the array includes the first switching cell.

According to an embodiment there is provided a non-transitory computer readable medium that stores instructions executable by a manufacturing system for:
  a. Obtaining an intermediate semiconductor item that includes a silicon substrate and a stack of layers that includes a monocrystalline silicon layer and is positioned between two silicon alloy layers. The silicon substrate includes diffusion regions;
  b. Performing Complementary Metal-Oxide-Semiconductor (CMOS) compliant operations to provide, based on the intermediate semiconductor item, a first switching cell that is formed on the silicon substrate, wherein the first switching cell includes: a first port, a second port, a third port, a monocrystalline silicon waveguide (MSW) that includes a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide.

According to an embodiment, the performing of the CMOS compliant operations processes includes etching the stack of layers by an etching process that exhibits a higher etching rate of the silicon alloy layers in comparison to an etching rate of the monocrystalline silicon layer.

According to an embodiment, the performing of the CMOS compliant operations includes forming a first MSW segment conductive path to the first MSW segment and forming a second MSW segment conductive path to the second MSW segment.

FIG. 1 illustrates an array of sixteen switching cells 100(1,1)-100(1,14) that are arranged in a grid that includes four rows and four columns, and eight bus waveguides that include four row bus waveguides 101(1)-101(4)-one per row, and four column bus waveguides 102(1)-102(4)-one per column.

Each switching cell includes four ports—in FIG. 1, the first port is located at the left of the switching cell, the second port is located at the top of the switching cell, the third port is located at the right of the switching cell, and the fourth port is located at the bottom of the switching cell.

A port may be an input port or an output port or may serve as an input/output port. Accordingly, each switching cell may support uni-directional communication or bi-directional communication.

Referring to the first switching cell 100(1,1)—a signal received by the first port may be directed to the third port via a waveguide crossing such as 112(1,1) or is directed to the fourth port through MSW 114(1,1). Yet for another example—and referring to the first switching cell 100(1,1)—a signal from the fourth port may be directed to the second port via the waveguide crossing such as 112(1,1) or is directed to the first port through MSW 114(1,1).

Referring to the sixteenth switching cell 100(4,4)—a signal received by the first port may be directed to the third port via a waveguide crossing such as 112(4,4) or is directed to the fourth port through MSW 114(4,4). Yet for another example—and referring to the sixteenth switching cell 100(4,4)—a signal from the fourth port may be directed to the second port via the waveguide crossing such as 112(4,4) or is directed to the first port through MSW 114(4,4).

The waveguide crossing may be a low-loss waveguide crossing that includes a central multi-mode interference region and tapers that extend from the central multi-mode interference region and be in optical communication with segments of the bus waveguides 101(1) and 102(1). An example of a low-loss waveguide crossing is illustrated in U.S. Pat. No. 10,061,065 which is incorporated herein by reference.

Figure 2:
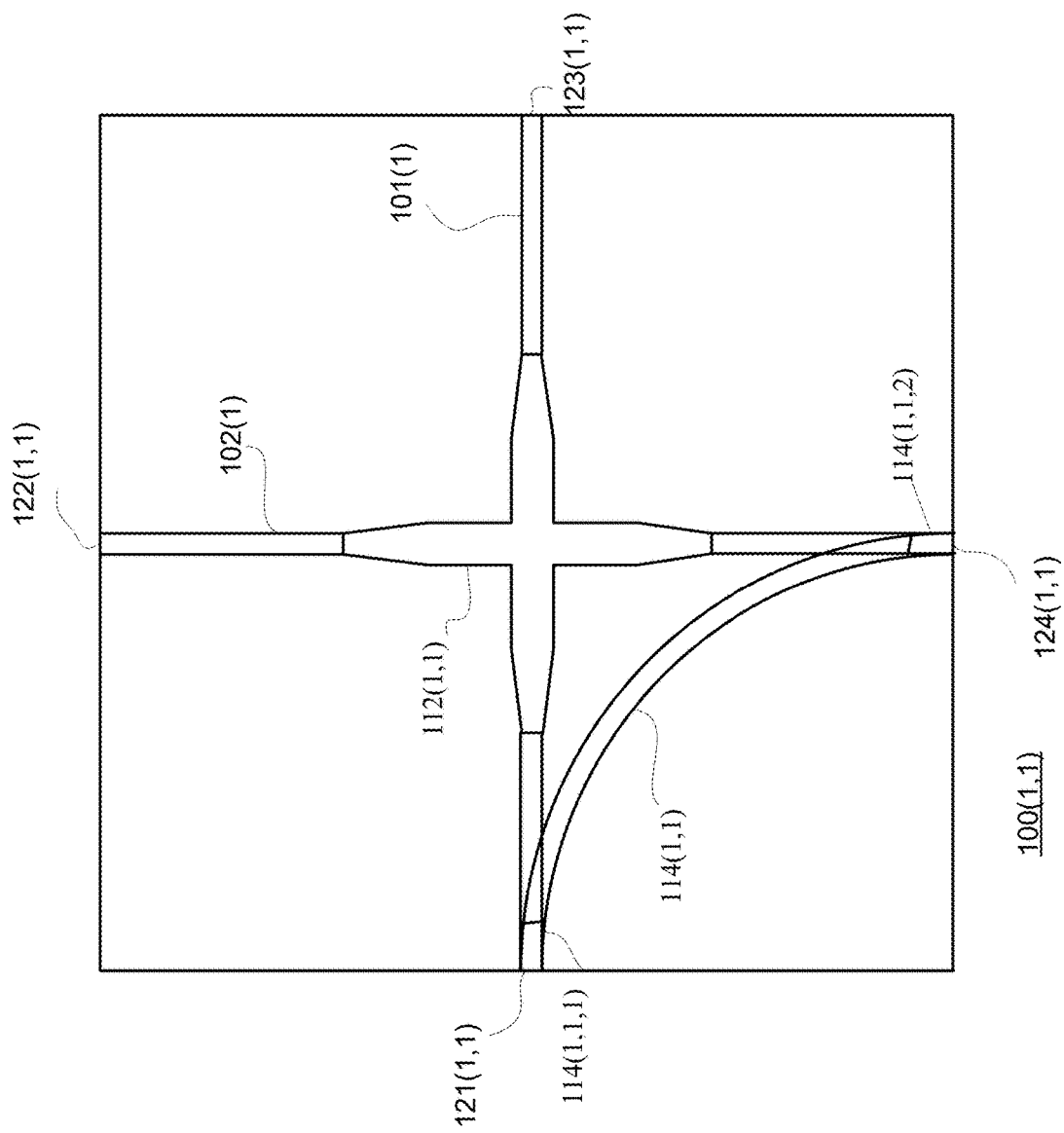
FIG. 2 illustrates an example of a switching cell.

FIG. 2 illustrates first switching cell 100(1,1) as including first port 121(1,1), second port 121(1,2), third port 121(1,3), fourth port 121(1,4), waveguide crossing 112(1,1) and MSW 114(1,1). One or more portion of the first bus and the second bus pass through the first switching cell.

According to an embodiment, any triplet of ports of a switching cell may be in communication with both the waveguide crossing and an MSW.

According to an embodiment, a port of a switching cell is only in communication with another port of the switching cell-through the waveguide crossing. For example—in FIG. 1 a signal from the second port of the switching cell may only be output from the fourth port. This is merely an example.

According to an embodiment, a switching cell includes more than one MSW.

Figure 3:
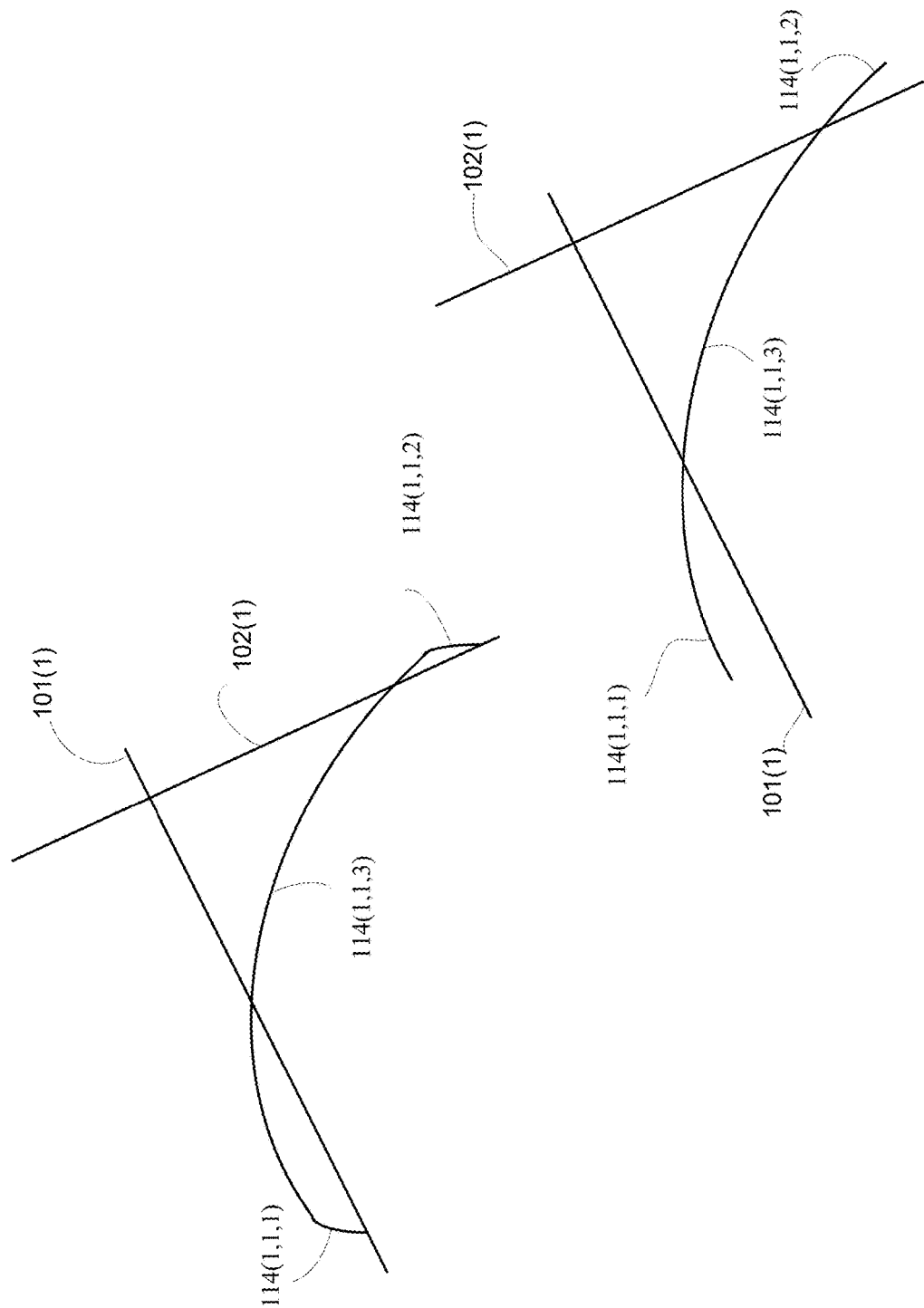
FIG. 3 illustrates an example of two configurations of a switching cell.

FIG. 2 and FIG. 3 also illustrate that the MSW 141 (1,1) includes a first MSW segment that is movable towards or away the first bus waveguide portion proximate to the first port, a second MSW segment that is movable towards or away the second bus waveguide portion proximate to the fourth port and a static MSW located between the first and second MSW segments. The static MSW segment is denoted 114(1,3) in FIG. 3.

Figure 4:
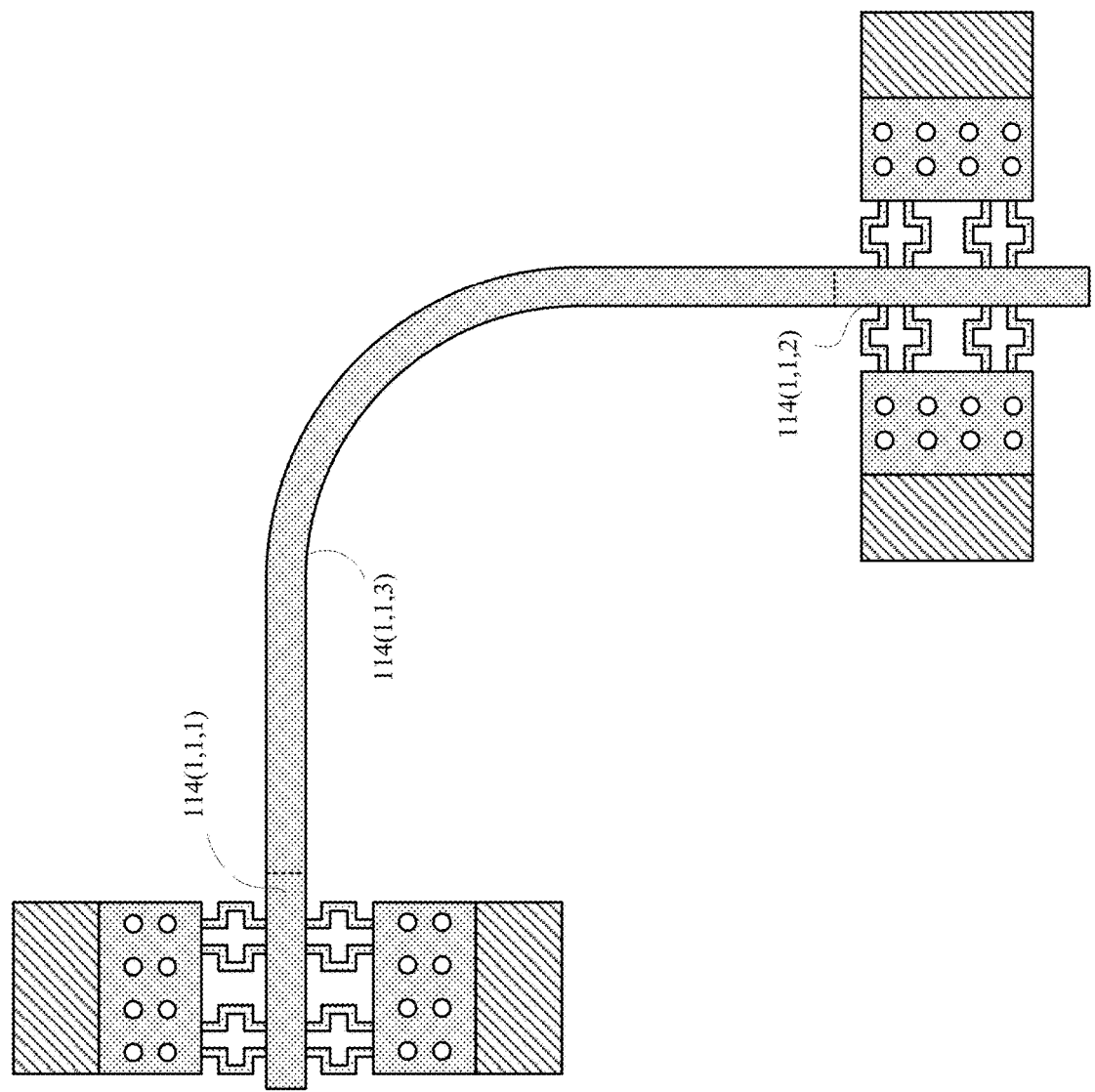
FIG. 4 illustrates an example of a monocrystalline silicon waveguide.

FIG. 3 also illustrates the MSW as optically coupling light between the first and fourth ports (upper portion of image) due to the proximity of the first and second MSW segments to the first and second bus waveguides, and an MSW having its first and second MSW spaced apart from the first and second bus waveguides-thereby allowing signals from the first port to pass through the waveguide crossing and reach the third port. FIG. 4 illustrates:

a. First MSW segment 114(1,1,1) being mechanically coupled to a MEMS fabricated structure that enables the movement of the first MSW segment in relation to the first bus waveguide.
b. Second MSW segment 114(1,1,2) being mechanically coupled to a MEMS fabricated structure that enables the movement of the second MSW segment in relation to second first bus waveguide.
c. Static MSW segment 114(1,1,3) located between the first and second MSW segments. The static MSW segment may be supported by support element (such as pillars, rods, or any other support element) located below the static MSW segment.

Figure 5:
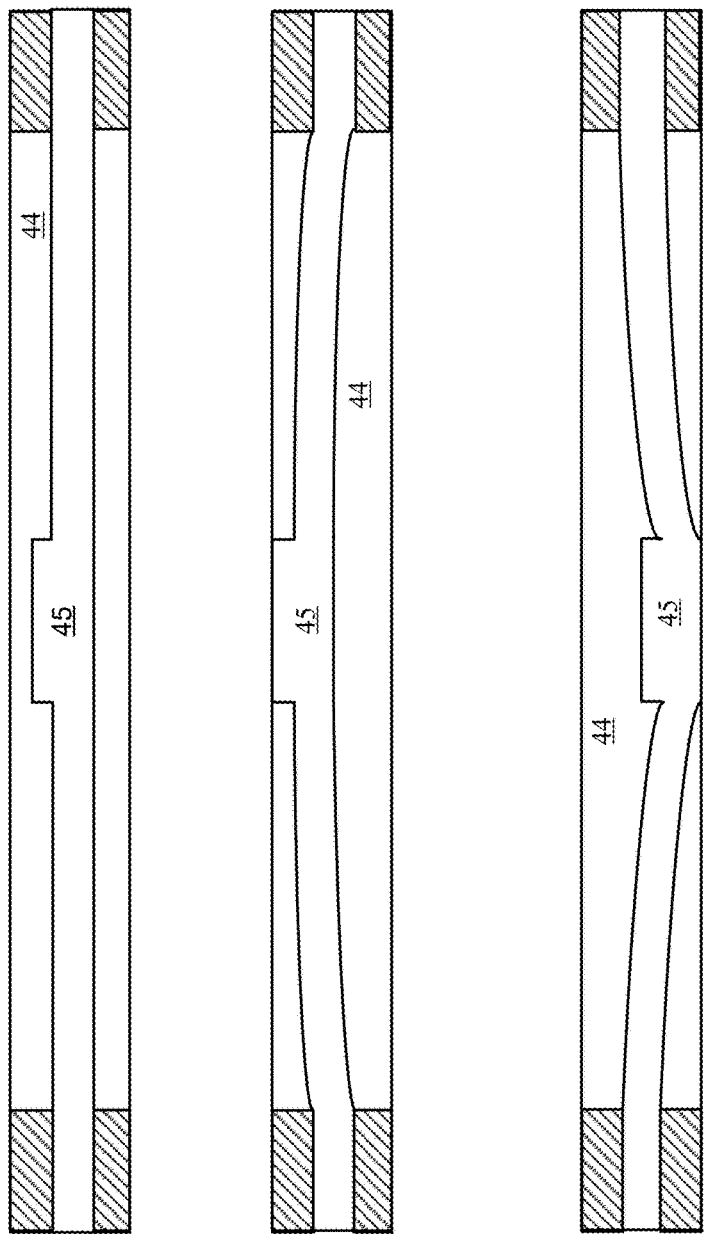
FIG. 5 illustrates an example of different positions of a monocrystalline silicon waveguide segment.

FIG. 5 illustrates cross section of a first SMW segment (denoted 45) at three different positions—an intermediate position (top of image), a proximal position (middle of the image) in which the first SMW segment is at a maximal distance from the silicon substrate, and a distal position (bottom of the image) in which the first SMW segment contacts the silicon substrate. The inner space in which the first SMW segment moves is denoted 44.

Figure 6:
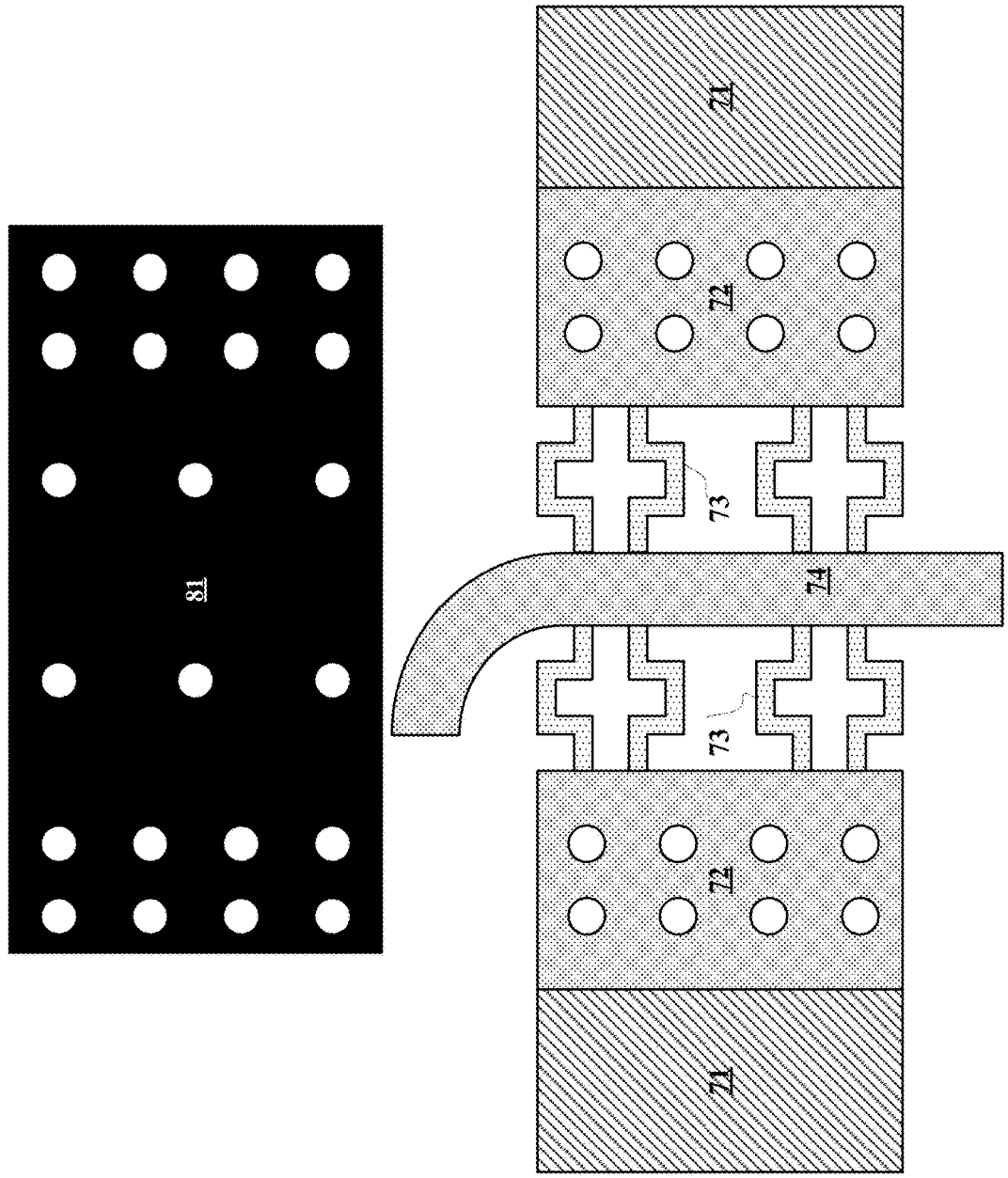
FIG. 6 illustrates an example of a monocrystalline silicon waveguide segment and various other elements of a switching cell.

FIG. 6 illustrates a portion 74 of the second SMW segment that is held by a MEMS fabricated structure that enables the movement of the first MSW segment in relation to the second bus waveguide. The MEMS fabricated structure includes springs 73 that are also in mechanical connection by an intermediate structure such as plates 72 that also extend below distal silicon germanium elements 71 and are supported by proximal silicon germanium elements (not shown).

Plates 72 are perforated to allow the formation of etch material conduits to convey etch materials that etch a stack of layers that includes a distal silicon germanium layer, a silicon layer and a proximal silicon germanium layer.

FIG. 6 also illustrates a distal electrode (denoted 81) that is also perforated to allow the formation of the etch material conduits during MEMS actuator release (oxide and then SiGe etchants)

Figure 7:
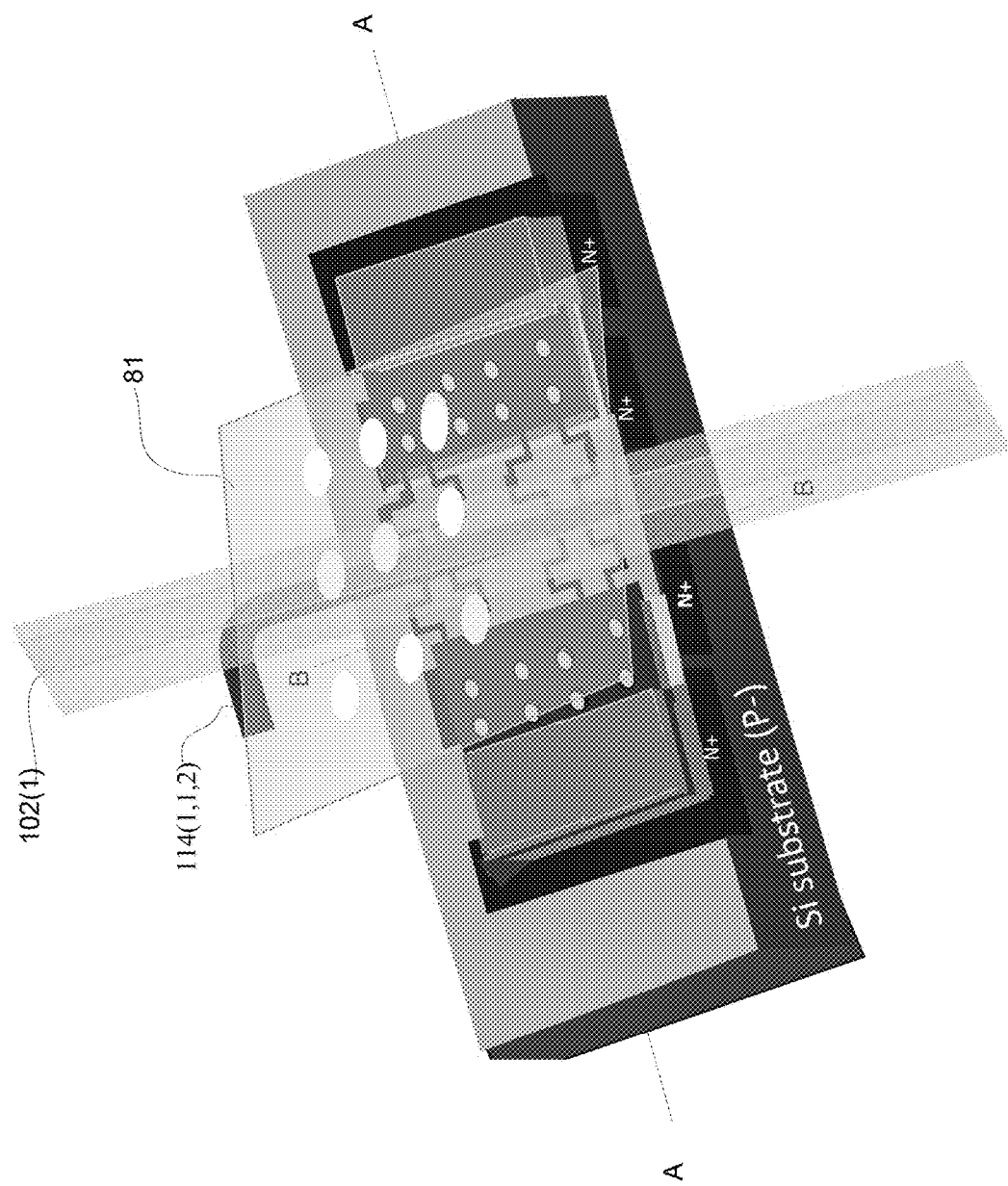
FIG. 7 illustrates an example of a switching cell, and a bus waveguide.

FIG. 7 illustrates various portions of the first switching cell, a portion of the second MSW segment 114(1,1,1), distal electrode (denoted 81), second bus 102(1), a portion of the MEMS fabricated structure, and the silicon substrate.

Figure 8:
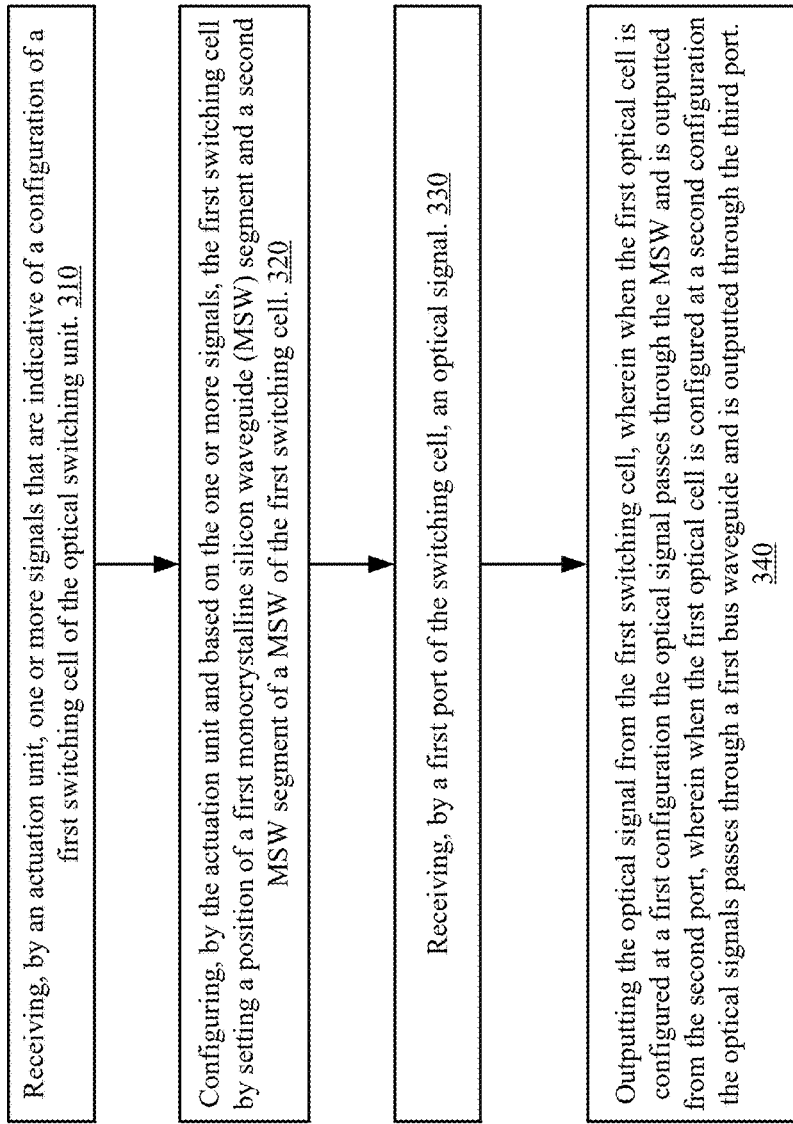
FIG. 8 illustrates an example of a method.

FIG. 8 illustrates an example of method 300 for optical switching.

According to an embodiment, method 300 includes step 310 of receiving, by an actuation unit, one or more signals that are indicative of a configuration of a first switching cell of the optical switching unit; the first switching cell is formed on the silicon substrate, and includes a first port, a second port, a third port, and an actuation unit.

According to an embodiment, step 310 is followed by step 320 of configuring, by the actuation unit and based on the one or more signals, the first switching cell by setting a position of a first monocrystalline silicon waveguide (MSW) segment and a second MSW segment of a MSW of the first switching cell; wherein a position of each one of the first MSW segment and the second MSW segment is selected out of at least three positions.

According to an embodiment, step 320 is followed by step 330 of receiving, by the first port, an optical signal.

According to an embodiment, step 330 is followed by step 340 of outputting the optical signal from the first switching cell, wherein when the first optical cell is configured at a first configuration the optical signal passes through the MSW and is outputted from the second port, wherein when the first optical cell is configured at a second configuration the optical signals passes through a first bus waveguide and is outputted through the third port.

According to an embodiment, when an array of switching cells is provided, steps 310, 320, 330 and 340 are executed for each cell in the path of any signals received by the array. The switching scheme of the ports from which the signals enter the array and the ports from which the signals should exit the array is known and the switching cells are configured accordingly. For example is a signal, according to the switching scheme, has to propagate along a single bus waveguide, the switching cells along the waveguide will not use their MSWs. If, for example a signal, according to the switching scheme, has to make a transition from a row bus waveguide to a column bus waveguide (or from a column bus waveguide to a row bus waveguide)—then at least one MSW of at least one switching cell will be used.

FIGS. 9-20 mark various items formed during various manufacturing processes as 11, 12, 13, 14, 15, 16, 16A, 16B, 17, 18, 19, 19A, 19B, 19D.

Figure 9:
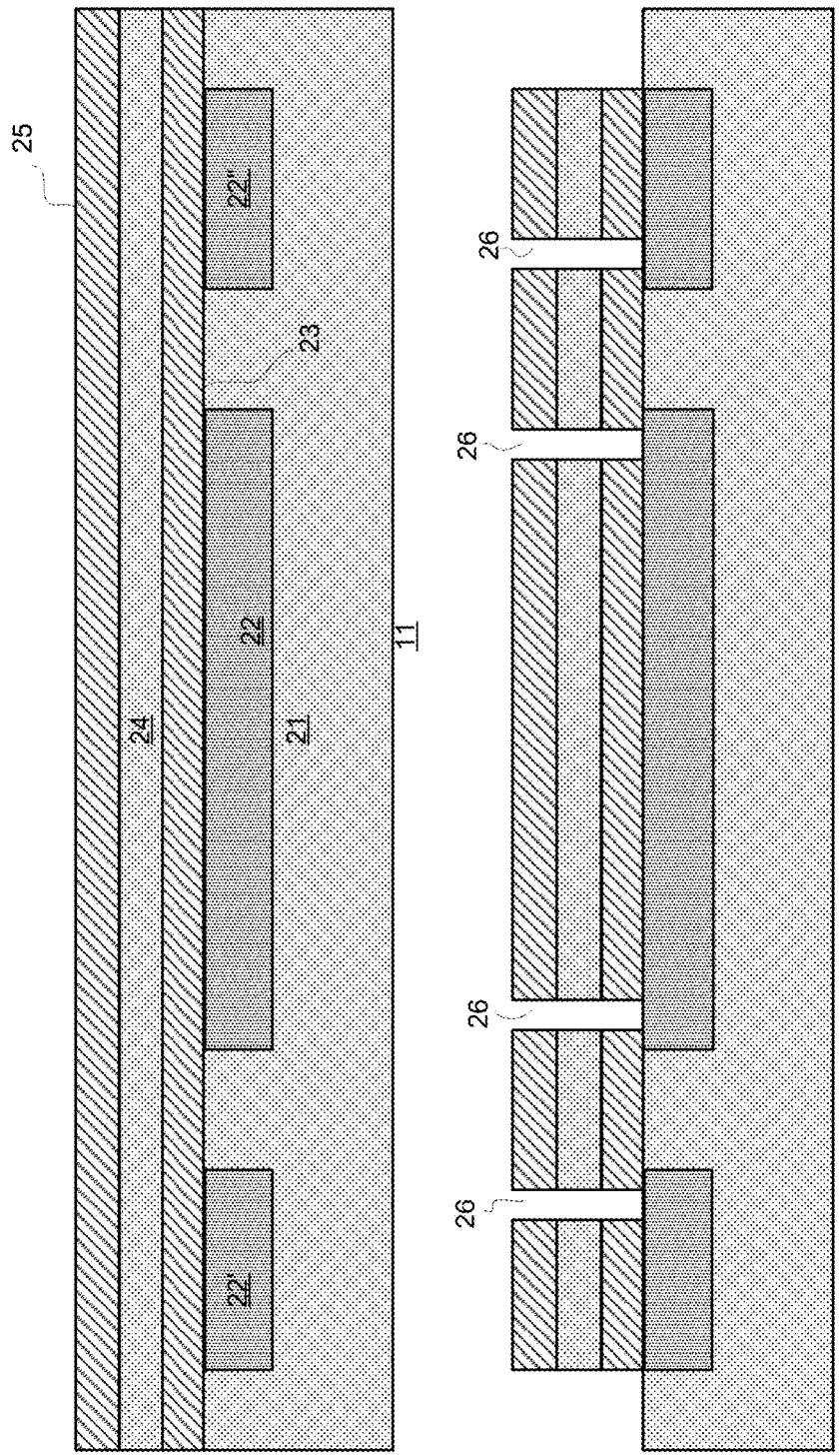

FIG. 9 illustrates an example of:
a. An intermediate semiconductor item 11 that includes a silicon substrate 21 (including diffusion regions 22', 22 and 22"), and a stack of layers that includes a monocrystalline silicon layer 24 that is positioned between two silicon alloy layers 23 and 25. The stack of layers may be generated using Epi growth. The diffusion regions may be formed using a first mask. According to an embodiment the silicon alloy is silicon germanium—but other silicon alloys may be used. For simplicity of explanation the following explanation will refer to silicon germanium.
b. Patterning to form the MSW, springs and the holes 26, and support elements. Holes 26 are later used for the etch material conduits to convey etch materials that etch the SiGe layers layers and SiO2. The layers are also trimmed from both sides. The support elements support the first or second MSW segments. This step may require using a second mask.

Figure 10:
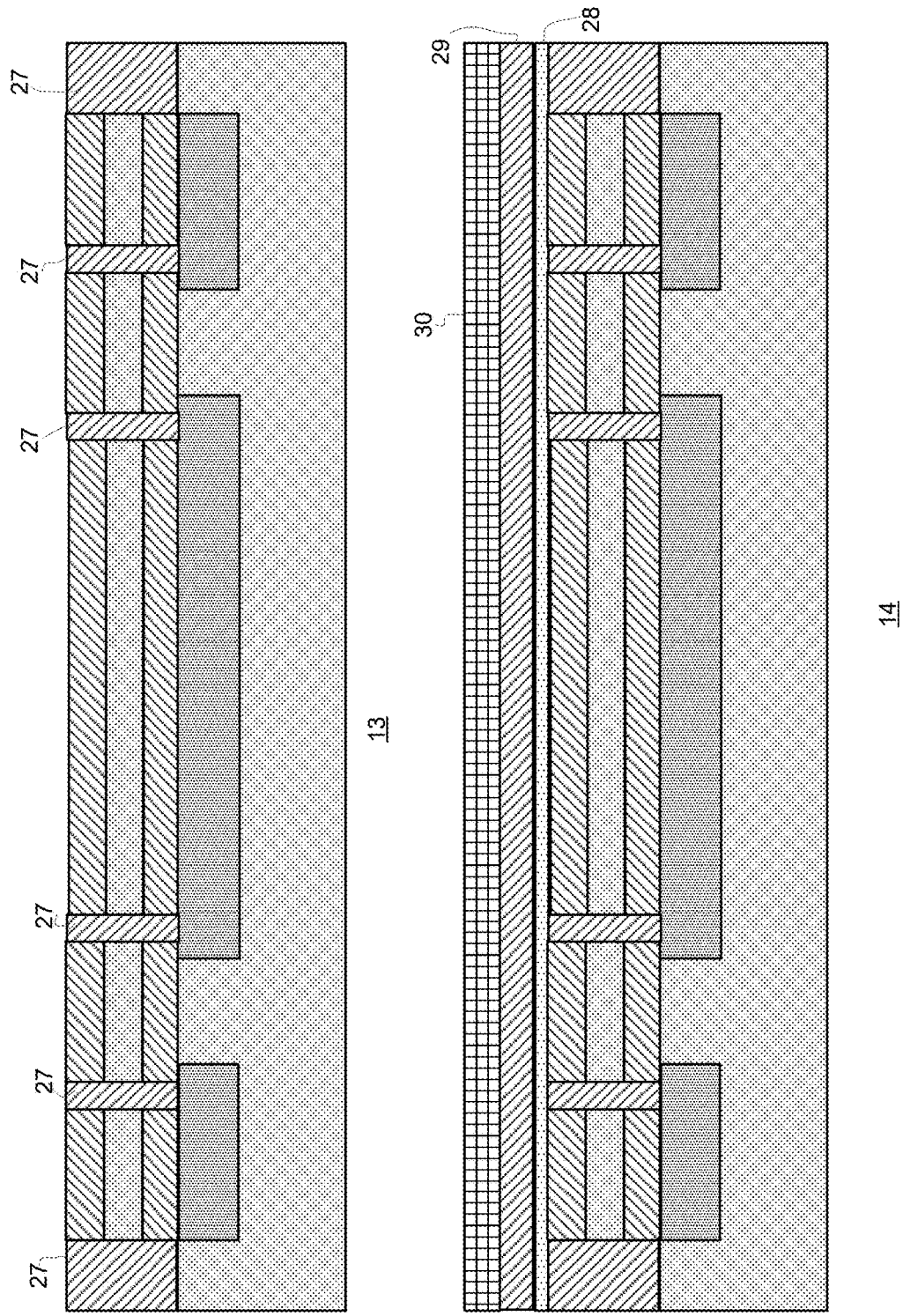

FIG. 10 illustrates an example of:
a. The filling with oxide 27 of the holes (denoted 26 in FIG. 8) and the spaces provided by the trimming. This may include TEOS, and chemical mechanical planarization (CMP) of a posterior silicon alloy layer.
b. The formation of another stack of layers that includes alumina layer 28, silicon oxide layer 29, and silicon nitride layer 30. An example of thickness—alumina layer is about 10 nanometer thick, the silicon oxide layer is 0.1-0.15 micron thick, and the silicon nitride layer is 0.2-0.3 nanometer thick.

Figure 11:
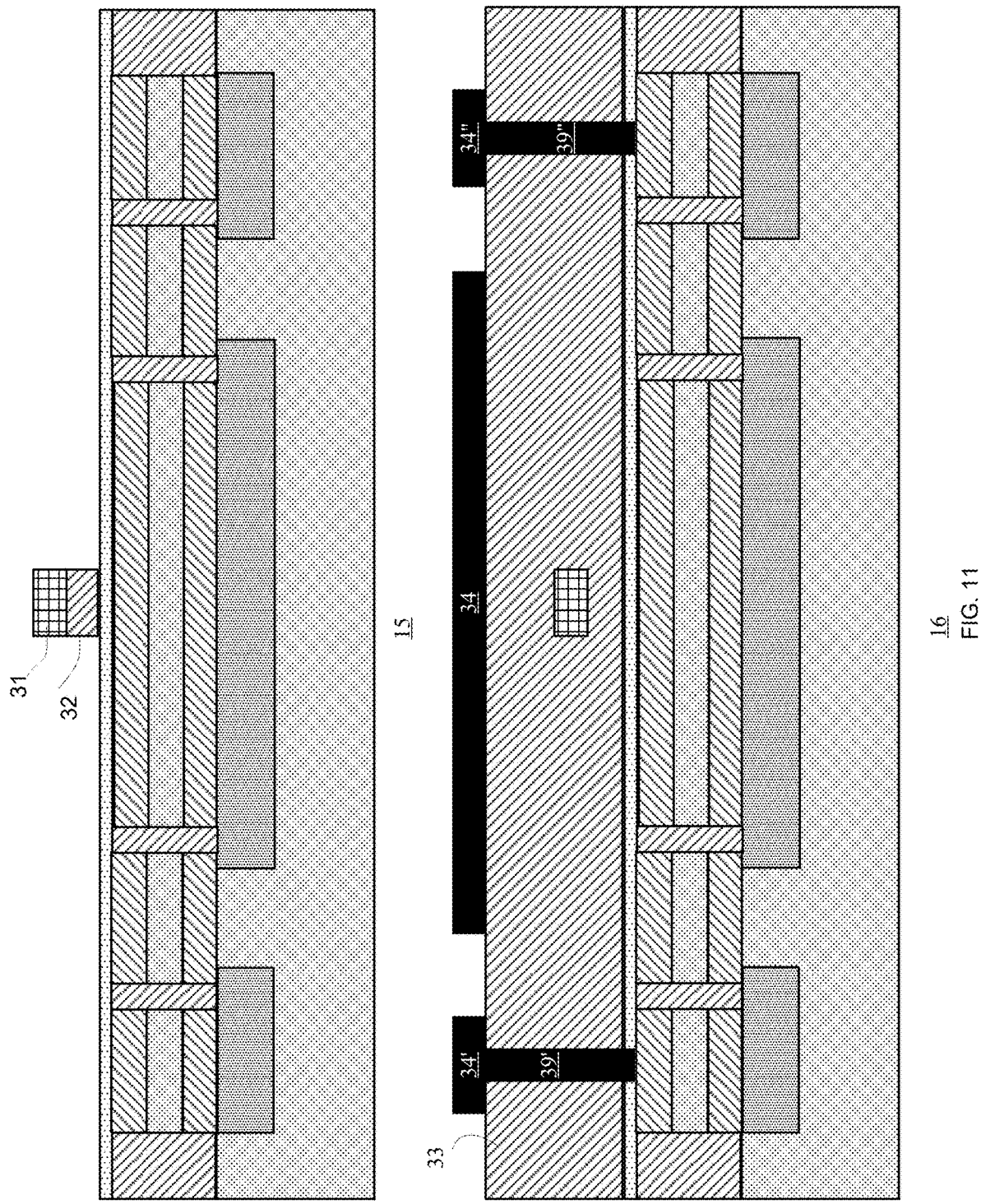

FIG. 11 illustrates an example of:
a. The formation of the bus waveguide 31 from the silicon nitride layer, and a formation of a silicon oxide layer support element 32 for supporting the buas waveguide.

This step requires using a third mask. Another mask is required when forming a rib shaped bus waveguide.

b. The addition of silicon oxide 33, and the formation of metal contacts 34, 34' and 34". This step may include depositing cladding oxide (for example 0.3-0.5 micron), followed by CMP, making contact openings and filling them with metal (tungsten) cs (fourth mask), CMP. Then deposition of M1 and definition of distal electrodes of the actuators.

Figure 12:
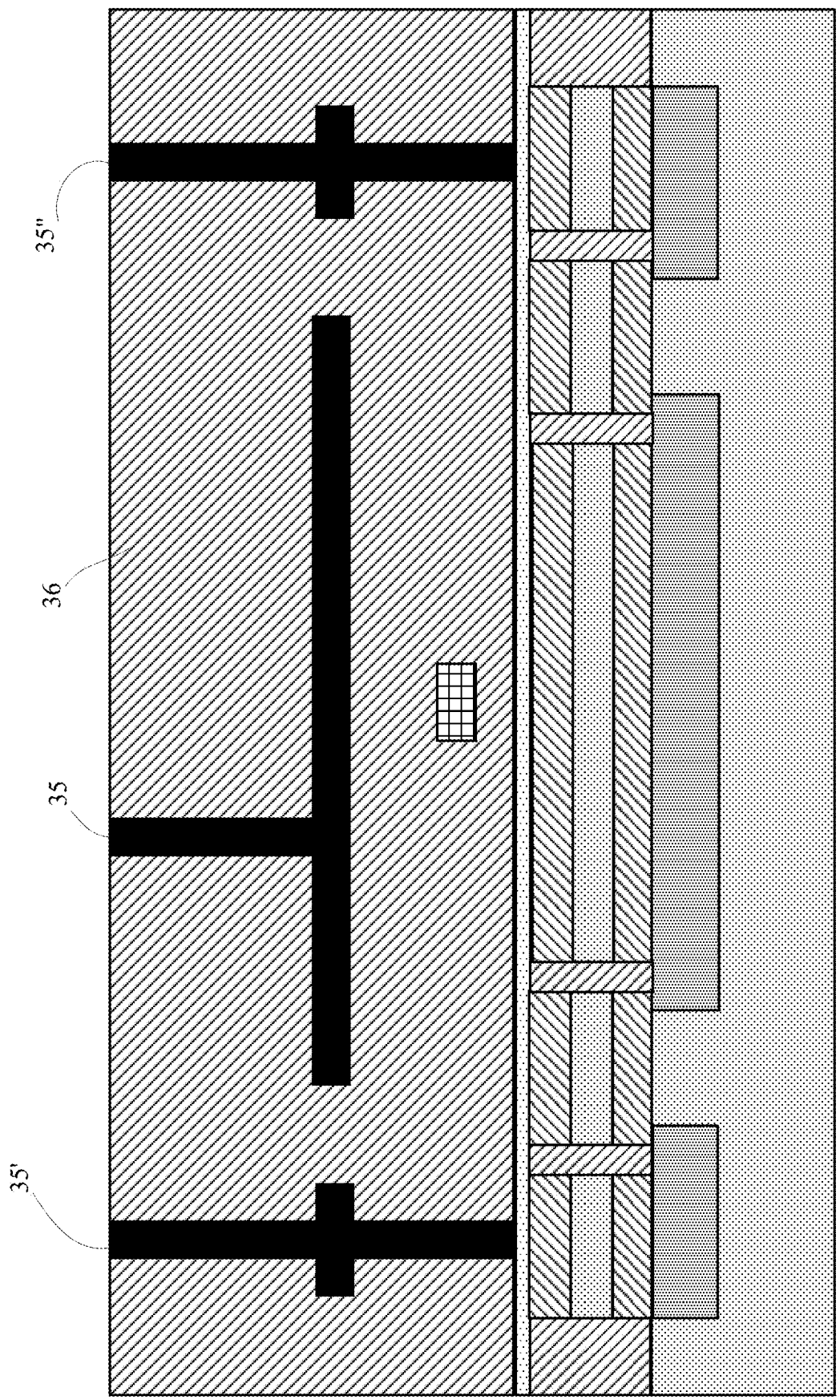

FIG. 12 illustrates an example of adding silicon oxide 36 and the formation of vias 35' 35' and 35".

Figure 13:
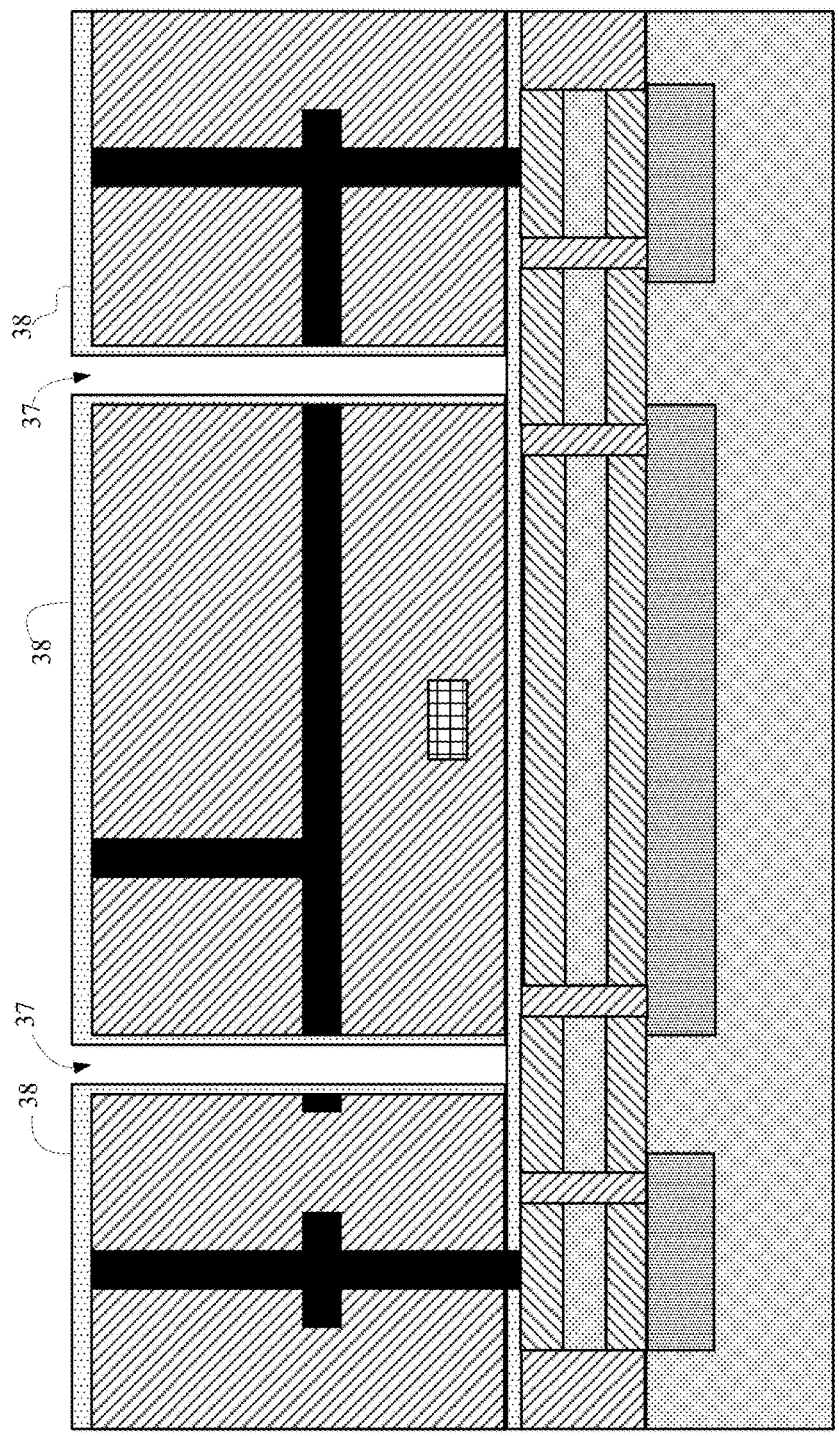

FIG. 13 illustrates an example of forming etch material conduits 37 and coating the etch material conduits (as well as the top of silicon oxide) with Alumna 38.

Figure 14:
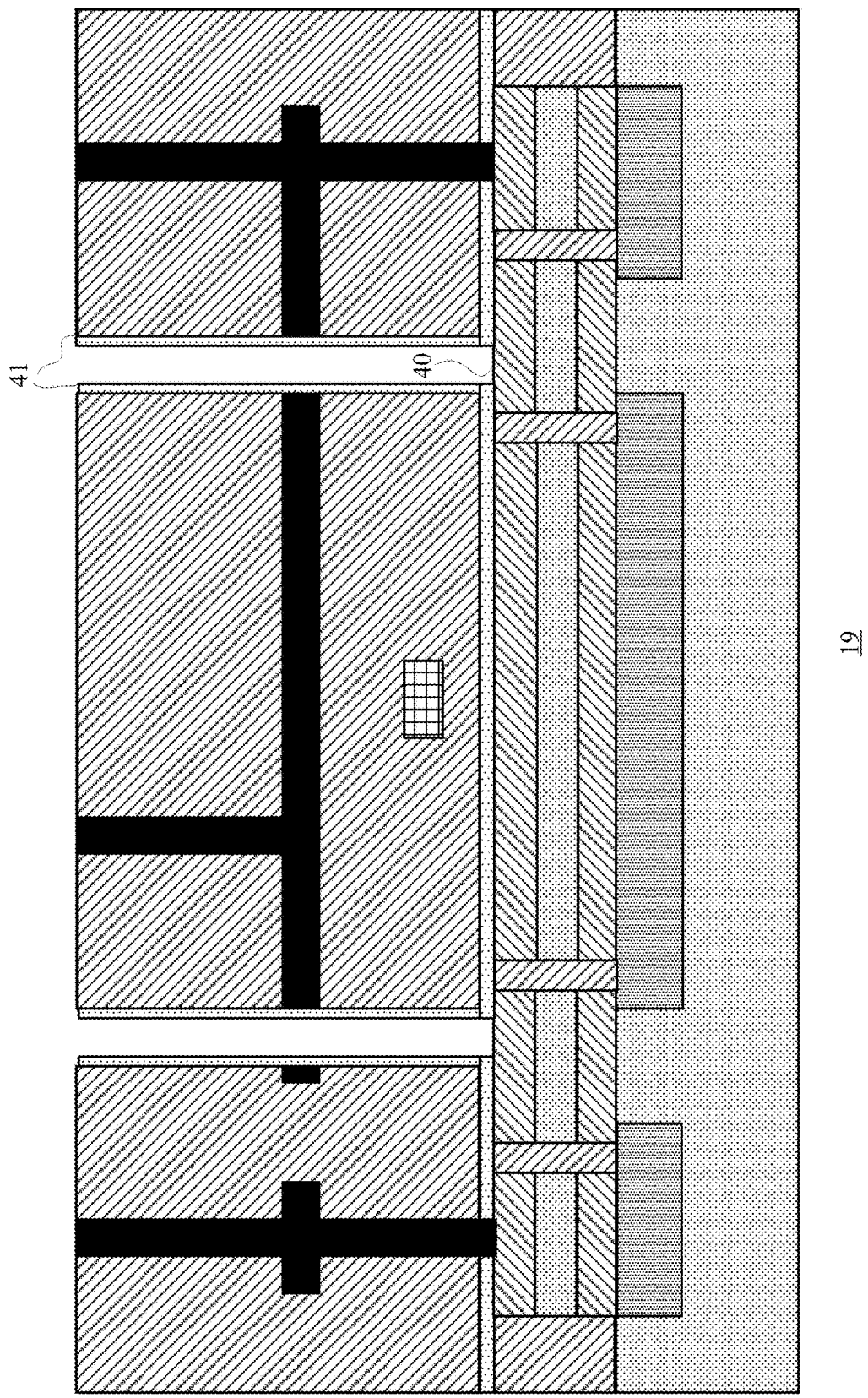

FIG. 14 illustrates of removing the Alumna 38 at the bottom of the trenches—thereby allowing the releasing of the first MSW segment (and of the second MSW segment). It should be noted that there is also an etching step in HF vapors to remove the silicon dioxide between the springs of the actuator and inside the conduit.

Figure 15:
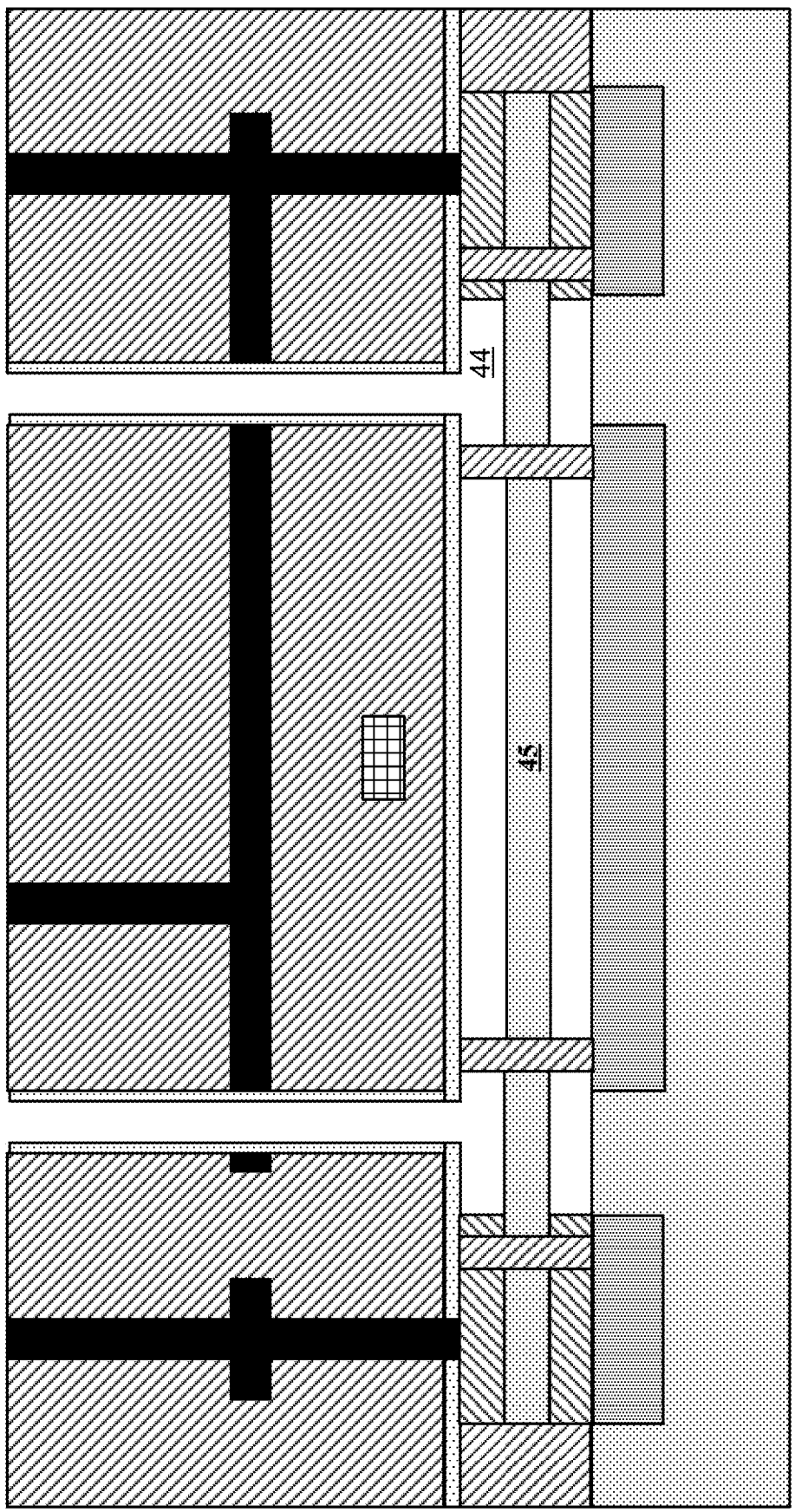

FIG. 15 illustrates the result of the releasing process—in which the silicon dioxide and then distal and proximal silicon germanium layers are etched using a vapor or wet etching.

Figure 16:
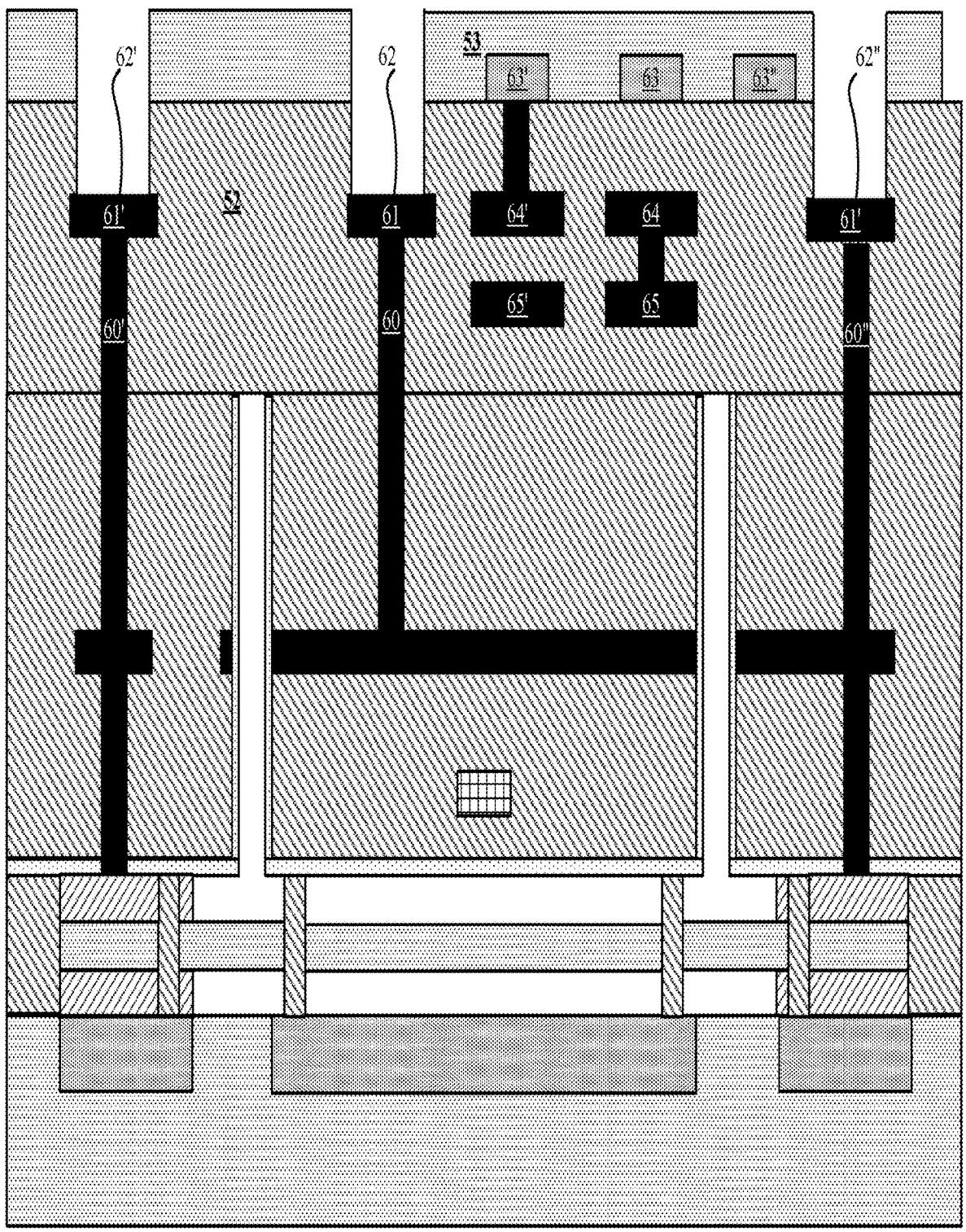

FIG. 16 illustrate an example of sealing the first wafer by bonding (for example fusion bonding or hybrid bonding) the first wafer to the second wafer. The second wafer is thinned and includes a silicon oxide layer 52 that includes vias 60, 60' and 60" and pads 61, 61' and 61" that are coupled to wires 61, 62' and 62", respectively. Pads 61, 61' and 61" and wires 61, 62' and 62" are located within recesses formed (for example by etching) in the thinned silicon oxide layer 52 and a top silicon layer 53 of the second wafer. The second wafer also illustrates top diffusion regions 63, 63' and 63" (illustrating CMOS elements, such e.g., diodes, resistors and CMOS transistors, and various conductors and vias 64, 64', 65 and 65' connecting CMOS devices of the second wafer.

Figure 17:
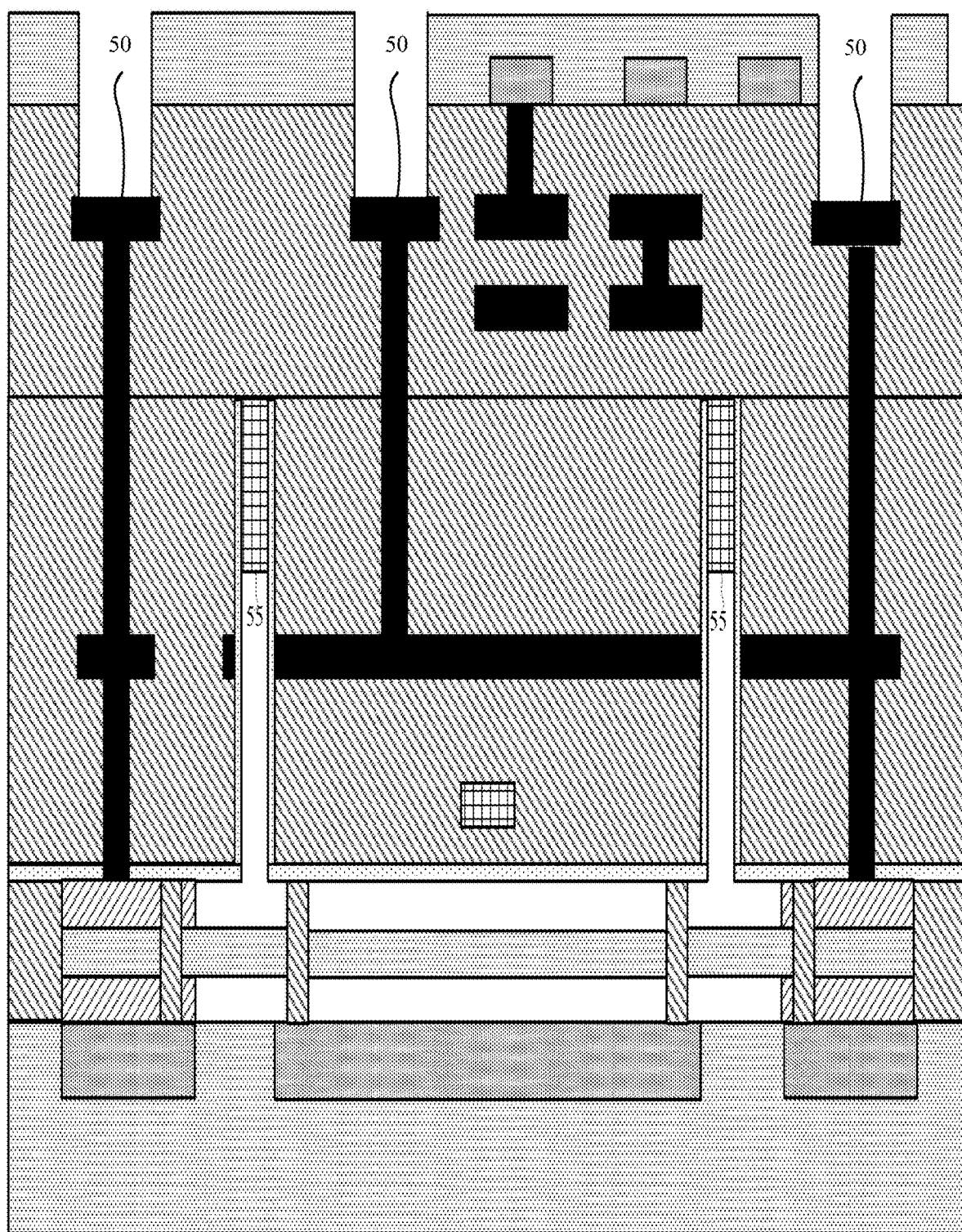

FIG. 17 illustrates a first and second wafer such as those illustrated in FIG. 15 and also includes additional sealing elements 50 formed in the distal ends of the etch material conduits. The sealing elements may be a thick CVD dielectric (e.g. PE CVD from TEOS+O3 at low T and 0.5-1 Torr pressures) or high resistance Polysilicon. CMP may be used to expose the vias for further hybrid bonding.

If not sealing, then mild dry etch of OCS wafer. It will remove $Al_2O_3$ from the top surface and would activate the surface Hybrid bonding (as in CIS)

Figure 18:
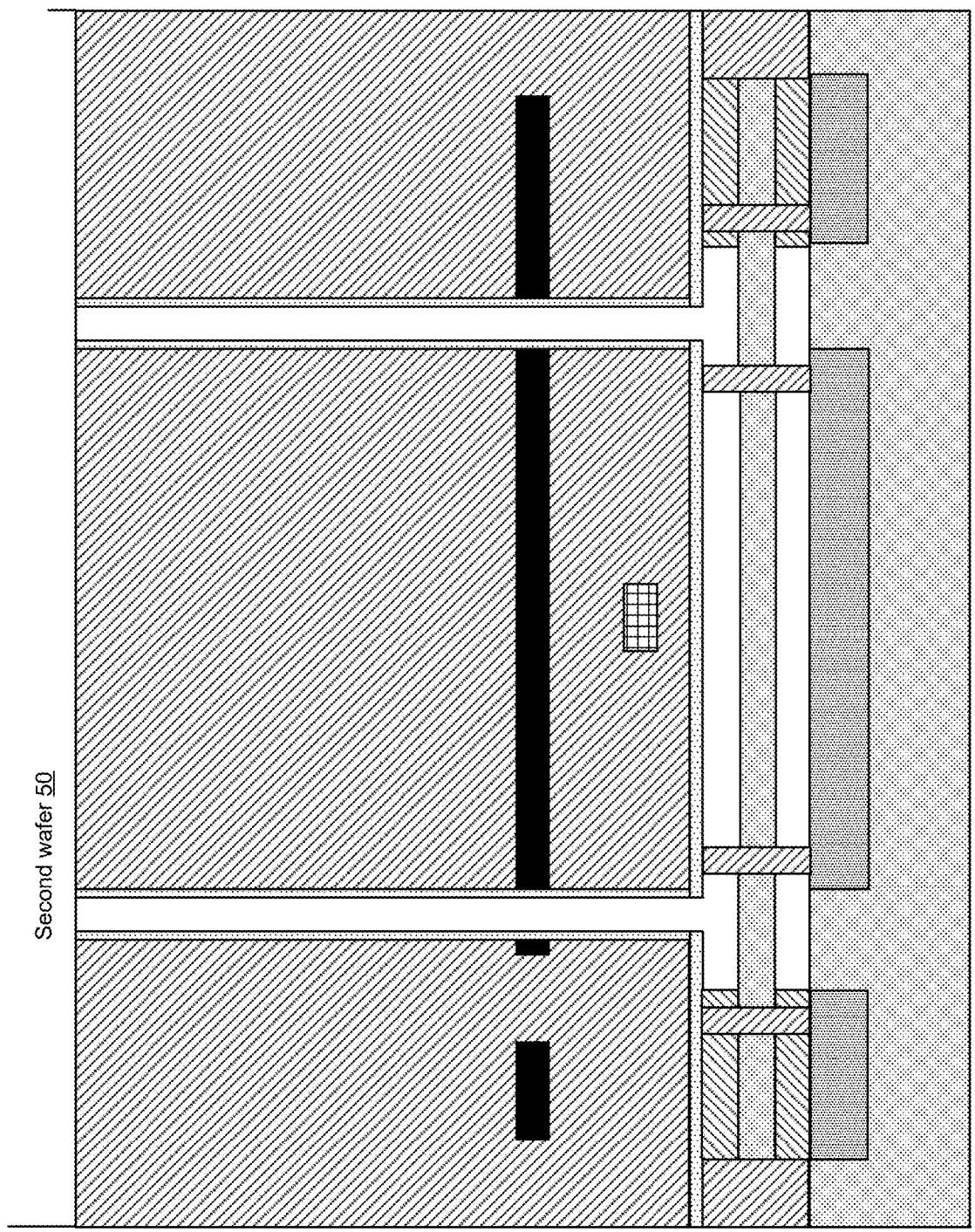

FIG. 18 illustrates a first wafer that is much thicker—it has a much thicker silicon oxide layer than those illustrates in FIGS. 12-15—for example about 350 micron versus 150 micron. The first wafer may also be processed by mild dry etching the first wafer—which will activate the top surface of the first wafer and will remove the Alumina. According to an embodiment another mask is used to decrease the thickness of the second wafer locally only at regions for making contact.

Figure 19:
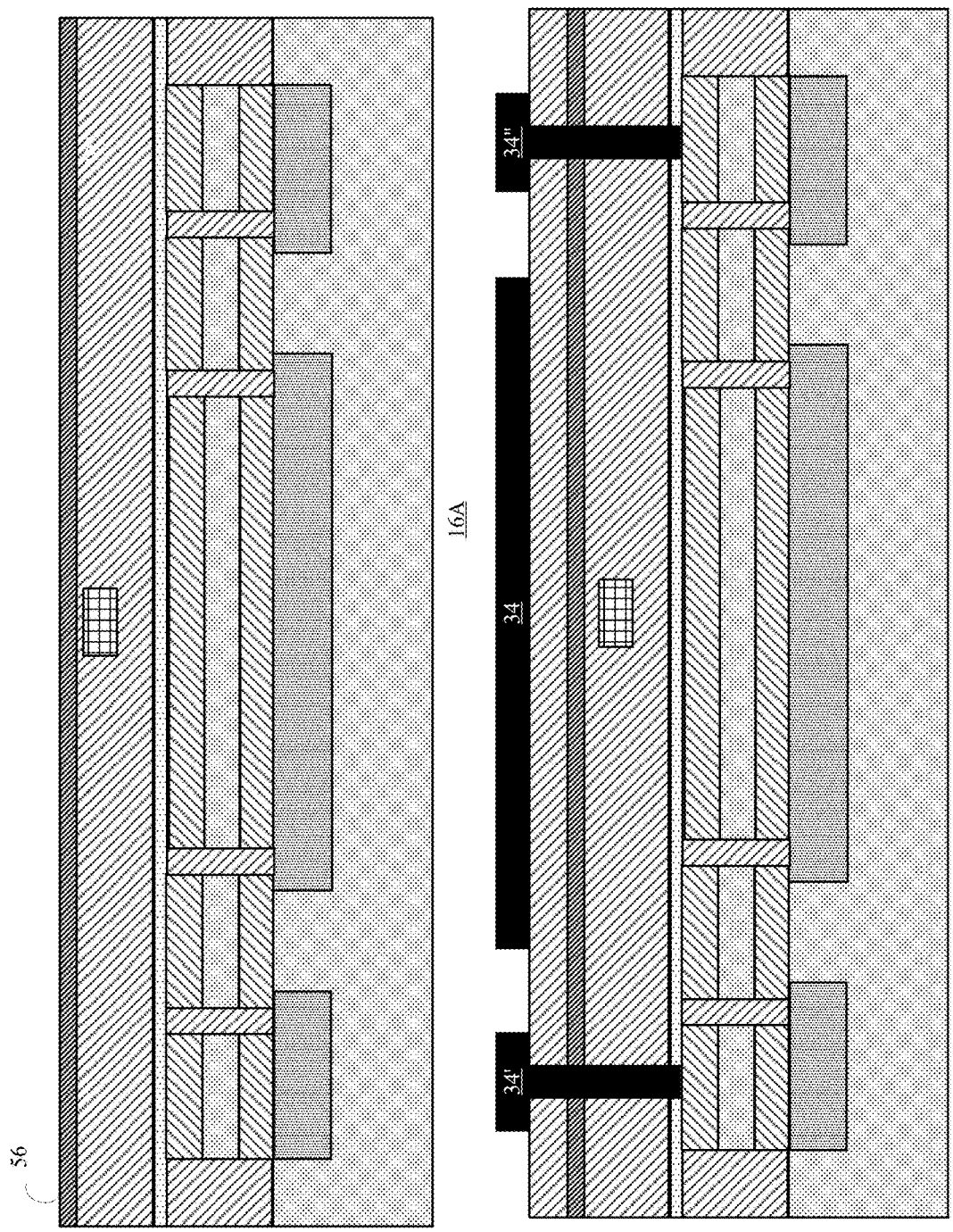

FIG. 19 illustrates an example of method 200 for manufacturing an optical switching system.

According to an embodiment, method 200 includes step 210 of obtaining an intermediate semiconductor item that includes a silicon substrate and a stack of layers that includes a monocrystalline silicon layer and is positioned between two silicon alloy layers. The silicon substrate includes diffusion regions.

Method 210 may include receiving the intermediate semiconductor item or manufacturing the intermediate semiconductor item or receiving the silicon substrate and manufacturing the stack of layers.

According to an embodiment, step 210 is followed by step 220 of performing Complementary Metal-Oxide-Semiconductor (CMOS) compliant operations to provide, based on the intermediate semiconductor item, a first switching cell that is formed on the silicon substrate. The first switching cell includes: a first port, a second port, a third port, a monocrystalline silicon waveguide (MSW) that includes a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide.

According to an embodiment, CMOS compliant operations include etching, CMP, patterning, and the like.

According to an embodiment, step 220 includes at least some of the following steps:

a. Patterning the intermediate semiconductor item to form the MSW, springs and holes, and support elements. The holes are later used for the etch material conduits to convey etch materials that etch the stack of layers. The layers are also trimmed from both sides. The support elements support the first or second MSW segments. This step may require using a second mask.

b. Filling with oxide the holes and the spaces provided by the trimming. This may include TEOS, and chemical mechanical planarization (CMP) of a posterior silicon alloy layer.

c. Forming another stack of layers that includes an alumina layer, a silicon oxide layer, and a silicon nitride layer.

d. Forming a bus waveguide from the silicon nitride layer, and forming a silicon oxide layer support element for supporting the bus waveguide.

e. Silicon Nitride layer can be etched (additional mask) to form rib waveguide profile f. Adding silicon oxide that serves as a cladding oxide of SiN waveguides and at the same time pre-metal dielectric. This includes depositing cladding oxide followed by CMP, making contact openings (fourth mask), for contacts to actuator plates, deposition of Tungsten (W) and then W CMP Deposition of M1 and etch (fifth mask) defines the distal electrodes of the actuators 34, connection to MSW-34' and connection to proximal electrode of the actuator 34" (connection to its N+ diffusion).

g. An additional Polysilicon or amorphous silicon layer (~0.1 μm) is optional to block the in process UV light resulting in SiN charging (like in our patent U.S. Pat. No. 7,439,575)—can be shown at FIG. 17.

h. In this case, the cladding oxide is deposited in two stages-before and after the UV light-absorbing polysilicon or amorphous silicon layer (denoted 56 in FIG. 20). Adding silicon oxide and forming vias.

i. Forming etch material conduits and coating the etch material conduits (as well as the top of silicon oxide) with Alumina (Al2O3)

j. Removing the Alumina at the bottom of the trenches—thereby allowing the releasing of the first MSW segment (and of the second MSW segment).

k. Performing a releasing process for releasing the monocrystalline silicon from the stack—by etching silicon dioxide within Al2O3 etching barriers and then distal and proximal silicon germanium layers using dry or wet etching. According to an embodiment the etching is confined and does not extend outside the borders of the optical switching device or outside the borders of a die or the first wafer—for example by barriers such as but not limited to a delimited such as but not limited to an N+ (or P+) frame (denoted 57 of the top view of FIG. 21) that surrounds a region in which the released monocrystalline silicon is located.

l. Sealing the first wafer.
  i. The sealing may include bonding (for example fusion bonding or hybrid bonding) the first wafer to the second wafer. This may also include thinning the second wafer and is followed by forming conductive paths to the vias of the first wafer.
  ii. Adding an additional sealing elements in the distal ends of the etch material conduits. The sealing elements may be a thick CVD dielectric (e.g. e.g. PE CVD from TEOS+O3 at low T and 0.5-1 Torr pressures) or high resistance Polysilicon. CMP may be used to expose the vias for further hybrid bonding.
  iii. This may also include processing the first wafer by mild dry etching the first wafer—which activates the top surface of the first wafer and removes the Alumina. According to an embodiment another mask is used to decrease the thickness of the second wafer locally only at regions for making access to metal pads.

FIG. 20 illustrates a cross sectional view along a transverse cross section B-B while FIGS. 9-19 illustrates cross sections along longitudinal axis A-A. FIG. 20 also illustrates a top view.

FIG. 20 illustrates a via that is electrically coupled to a pole 56 that is in contact with diffusion region 22 to provide a conductive path that extends above the membrane—which in turn may be electrically coupled to a conductive path that extends to the sides. FIG. 20 illustrates a frame 57 that can be made of various materials such as N+ (or P+) doped silicon that confines the etching region. For simplicity of explanation various other portions are omitted.

Any reference to any of the terms "comprise", "comprises", "comprising" "including", "may include" and "includes" may be applied mutatis mutandis to any of the terms "consists", "consisting", "consisting essentially of". For example—any of the rectifying circuits illustrated in any figure may include more components than those illustrated in the figure, only the components illustrated in the figure or substantially only the components illustrated in the figure.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "proximal", "distal", "front", "back," "top", "bottom", "over", "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for manufacturing an optical system, the method comprises:
   obtaining an intermediate semiconductor item that comprises a silicon substrate and a stack of layers that comprises a monocrystalline silicon layer and is positioned between two silicon alloy layers; wherein the silicon substrate comprises diffusion regions; and
   performing Complementary Metal-Oxide-Semiconductor (CMOS) compliant operations to provide, based on the intermediate semiconductor item, a first switching cell that is formed on the silicon substrate,
   wherein the first switching cell comprises: a first port, a second port, a third port, a monocrystalline silicon waveguide (MSW) that comprises a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide; wherein the performing of the CMOS compliant operations processes comprises etching the stack of layers by an etching process that exhibits a higher etching rate of the silicon alloy layers in comparison to an etching rate of the monocrystalline silicon layer.

2. The method according to claim 1, wherein the etching is preceded by forming etch material conduits, and the etching comprises using the etch material conduits to convey etch materials that etch the stack of layers.

3. The method according to claim 2, wherein the material conduits have a diameter that ranges between 0.5 to 2 microns.

4. The method according to claim 2, wherein the etching is followed by sealing the etch material conduits.

5. The method according to claim 4, wherein the optical system is included in a first wafer, wherein the sealing comprises bonding the first wafer to a second wafer.

6. The method according to claim 5, further comprising thinning the second wafer and exposing second wafer vias formed within the second wafer, the second wafer vias are electrically coupled to first wafer vias of the first wafers that are electrically coupled to at least some electrodes of the actuation unit.

7. The method according to claim 5, wherein the forming of the etch material conduits comprising coating a surface of the first wafer and the etch material conduits with a coating material, wherein the bonding is preceded by removing the coating material.

8. The method according to claim 7, wherein the coating material is aluminum oxide.

9. The method according to claim 7, further comprising thinning the first wafer.

10. The method according to claim 5, wherein the bonding is preceded by filling at least a portion of the etch material conduits with a sealing material.

11. The method according to claim 1, wherein the performing of the CMOS compliant operations comprises forming a first MSW segment conductive path to the first MSW segment and forming a second MSW segment conductive path to the second MSW segment.

12. The method according to claim 11, wherein the performing of the CMOS compliant operations comprises forming a first substrate electrode conductive path to a first substrate electrode, and a second substrate electrode conductive path to a second substrate electrode.

13. The method according to claim 12, wherein the performing of the CMOS compliant operations comprises forming a first distal electrode conductive path to a first distal electrode and forming a second distal electrode conductive path to a second distal electrode.

14. The method according to claim 13, wherein the first MSW segment conductive path and the second MSW segment conductive path to the second MSW segment reach one facet of the first wafer and the first distal electrode conductive path, and the second distal electrode conductive path reach another facet of the first wafer.

15. The method according to claim 1, wherein the performing of the CMOS compliant operations provides an array of switching cells, the array comprises the first switching cell.

16. The method according to claim 1, wherein the silicon alloy layers comprise silicon germanium.

17. A method for manufacturing an optical system, the method comprises:
   obtaining an intermediate semiconductor item that comprises a silicon substrate and a stack of layers that comprises a monocrystalline silicon layer and is positioned between two silicon alloy layers; wherein the silicon substrate comprises diffusion regions; and
   performing Complementary Metal-Oxide-Semiconductor (CMOS) compliant operations to provide, based on the intermediate semiconductor item, a first switching cell that is formed on the silicon substrate,
   wherein the first switching cell comprises: a first port, a second port, a third port, a monocrystalline silicon waveguide (MSW) that comprises a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide; wherein the performing of the CMOS compliant operations comprises forming a Polysilicon layer or amorphous silicon layer for shielding the bus waveguides.

18. A non-transitory computer readable medium that stores instructions executable by a manufacturing system for:
   obtaining an intermediate semiconductor item that comprises a silicon substrate and a stack of layers that comprises a monocrystalline silicon layer and is positioned between two silicon alloy layers; wherein the silicon substrate comprises diffusion regions; and
   performing Complementary Metal-Oxide-Semiconductor (CMOS) compliant operations to provide, based on the intermediate semiconductor item, a first switching cell that is formed on the silicon substrate,
   wherein the first switching cell comprises: a first port, a second port, a third port, a monocrystalline silicon waveguide (MSW) that comprises a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide; wherein the performing of the CMOS compliant operations processes comprises etching the stack of layers by an etching process that exhibits a higher etching rate of the silicon alloy layers in comparison to an etching rate of the monocrystalline silicon layer.

19. The non-transitory computer readable medium according to claim 18, wherein the performing of the CMOS compliant operations comprises forming a first MSW segment conductive path to the first MSW segment and forming a second MSW segment conductive path to the second MSW segment.

20. A non-transitory computer readable medium that stores instructions executable by a manufacturing system for:
obtaining an intermediate semiconductor item that comprises a silicon substrate and a stack of layers that comprises a monocrystalline silicon layer and is positioned between two silicon alloy layers; wherein the silicon substrate comprises diffusion regions; and
performing Complementary Metal-Oxide-Semiconductor (CMOS) compliant operations to provide, based on the intermediate semiconductor item, a first switching cell that is formed on the silicon substrate, wherein the first switching cell comprises: a first port, a second port, a third port, a monocrystalline silicon waveguide (MSW) that comprises a first MSW segment and a second MSW segment, and an actuation unit that is configured to move each one of the first MSW segment and the second MSW segment between at least three different positions thereby determining whether an optical signal received at the first port is (a) directed through the MSW to the second port, or (b) is directed to the third port through a first bus waveguide;

wherein the performing of the CMOS compliant operations comprises forming a Polysilicon layer or amorphous silicon layer for shielding the bus waveguides.

* * * * *